April 7, 1959  J. MARKESTEIN ET AL  2,880,681
SHOCK ABSORBING SUPPORT
Filed Aug. 26, 1953  2 Sheets-Sheet 1

INVENTORS
John Markestein &
Corless B. Nelson
BY
S.C. Thorpe
ATTORNEY

April 7, 1959   J. MARKESTEIN ET AL   2,880,681
SHOCK ABSORBING SUPPORT

Filed Aug. 26, 1953   2 Sheets-Sheet 2

INVENTORS
John Markestein &
Corless B. Nelson
BY
J.C. Thorpe
ATTORNEY

United States Patent Office 2,880,681
Patented Apr. 7, 1959

2,880,681

SHOCK ABSORBING SUPPORT

John Markestein, Westchester, and Corless B. Nelson, Chicago, Ill., assignors to General Motors Corporation, Detroit, Mich., a corporation of Delaware Application August 26, 1953, Serial No. 376,602

5 Claims. (Cl. 105—368)

This invention relates generally to shock absorbing means and more particularly to resilient shock absorbing supports for use on railway vehicles particularly adapted to transport motor truck semi-trailers.

The recent trend of the trucking industry to use the railroads to transport their motor truck semi-trailers between points which normally constitute the longer hauls and the fact that considerable damage has been done to goods carried in this manner has emphasized the need for some suitable shock absorbing means acting between the semi-trailers and the railway vehicles for hauling these semi-trailers or the like which will adequately cushion and damp sudden movements of the railway vehicle relative to the semi-trailers and goods carried thereby. It will be appreciated, however, that an adequate shock absorbing means acting between the railway vehicle and the semi-trailers must be extremely rugged because of the tremendous inertia forces created by the weight of the loaded semi-trailers. Such a shock absorbing means to be practical should also be readily accessible for servicing, easily assembled, and relatively inexpensive to manufacture.

It is therefore an object of this invention to provide a novel shock absorbing means of extremely rugged construction adapted to act between a railway vehicle and the semi-trailers to be carried thereon to absorb sudden changes in movement of said vehicle and cushion their transferal to the semi-trailers and the goods carried thereby.

It is a further object of this invention to combine the unique shock absorbing means with a novel support on the railway vehicle, the support being provided with means to receive and anchor the king pins of the semi-trailers carried on said vehicles.

It is another object of this invention to provide a railway vehicle with unique shock absorbing means adapted to act between the vehicle and semi-trailers transported thereon, the shock absorbing means being readily accessible for servicing, easily assembled, and inexpensive to manufacture.

Figure 1:
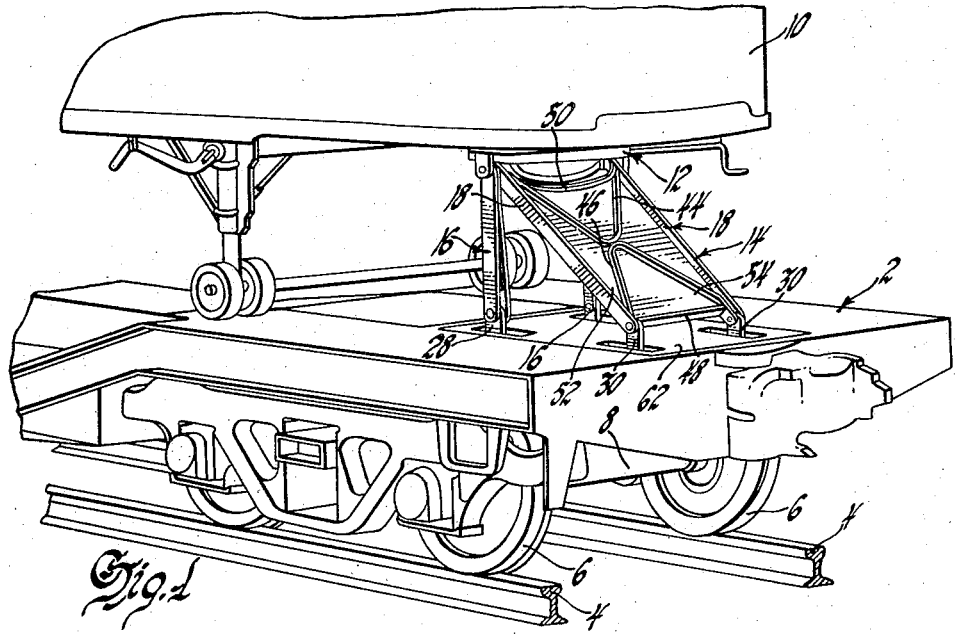
Fig. 1 is a perspective view of one end of a railway vehicle showing a motor truck semi-trailer supported thereon and the new shock absorbing support acting therebetween.
Figure 2:
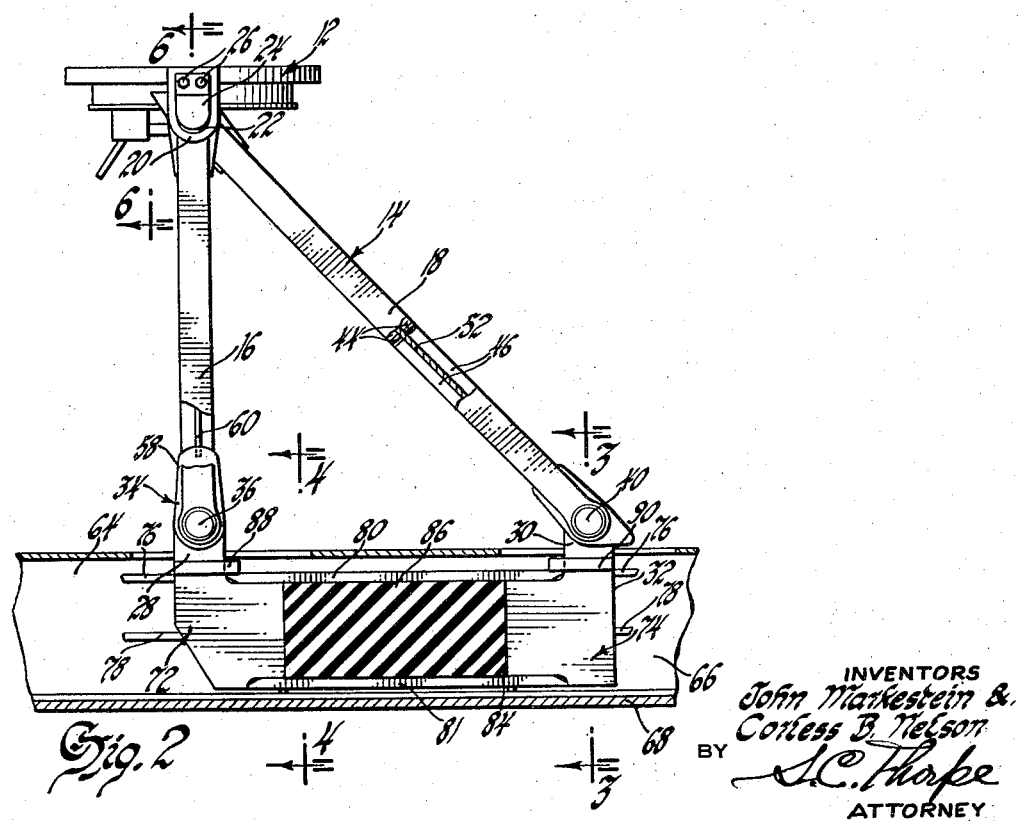
Fig. 2 is a view taken substantially on line 2—2 of Fig. 3 with parts broken away and in section and shows the general pivoted construction of the king pin receiving means and the struts which support the king pin receiving means on a novel shock absorbing sliding block assembly.

Referring first to Fig. 1, one end of a railway vehicle, indicated generally by the numeral 2, is shown supported on the rails 4 by means of the usual supporting wheels 6 and axles 8. Located on the freight car 2 is a motor truck semi-trailer 10 of the class existing in large numbers which are currently used on highways and thoroughfares to transport goods between various points. The semi-trailer 10 is equipped with the usual king pin normally received in the "fifth wheel" of a motor truck tractor. When in position on the railway vehicle 2 the king pin of the semi-trailer 10 is received in a king pin anchoring means generally designated by the numeral 12. Interposed between this anchoring means 12 and the railway vehicle 2 is a shock absorbing support, indicated generally by the numeral 14. This shock absorbing support 14, alone and in combination with the railway vehicle 2 and anchoring means 12, forms the subject of this invention and will now be described in detail in conjunction with the remaining figures in the drawings.

Figure 3:
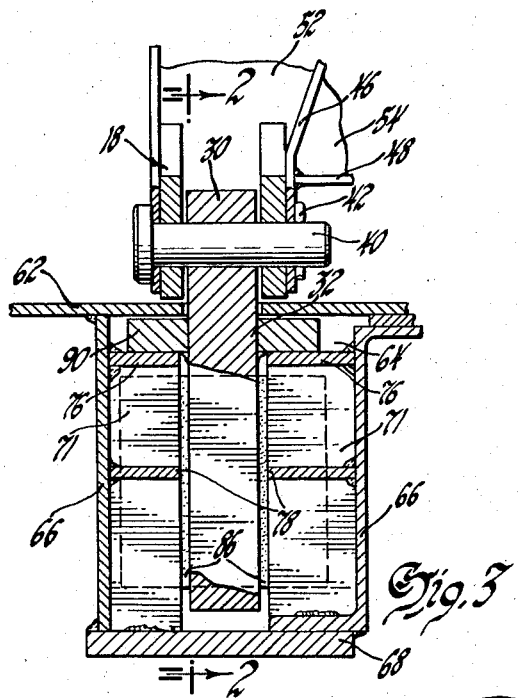
Fig. 3 is a view partly in section taken on line 3—3 of Fig. 2 with portions broken away to show the manner in which the inclined struts are pivoted to the sliding block assemblies and how the sliding block assemblies are recessed and enclosed in the ends of the vehicle.
Figure 4:
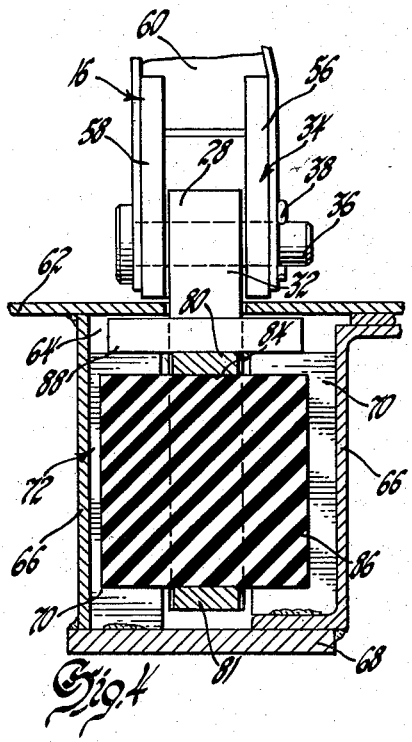
Fig. 4 is a section on the line 4—4 of Fig. 2 and shows the large resilient block nested in its recess and acting between the sliding block assembly and laterally projecting abutments provided on the inner walls of the recess.
Figure 5:
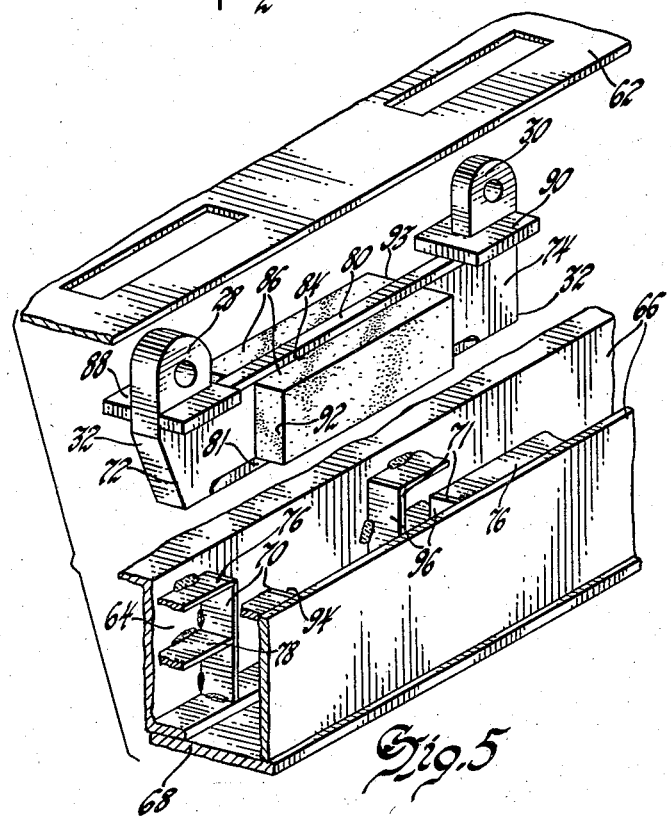
Fig. 5 is an exploded view of the shock absorbing portion of the support including a cover plate, the sliding block assembly with the resilient block assembled therein, and its recess including the laterally projecting abutments for engaging the resilient block.
Figure 6:
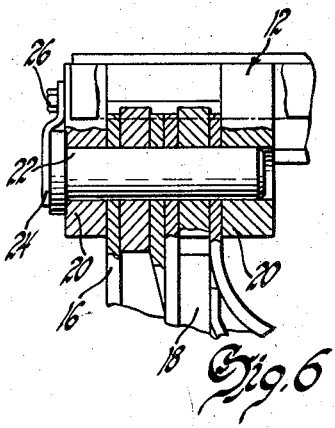
Fig. 6 is a section taken on the line 6—6 of Fig. 2 and shows the details of construction of the pivot assembly acting between the inclined and vertical struts and the semi-trailer king pin anchoring means.

The support 14 comprises sets of vertical struts 16 and inclined sets of struts 18 which are pivotally connected at their upper ends to the anchoring means 12. The anchoring means 12 is provided with pairs of depending trunnions 20 on either side thereof. Interposed between each pair of trunnions is the upper end of vertical strut 16 and the upper end of an inclined strut 18. Pivotally securing each side of the anchoring means 12 to the struts 16 and 18 is a pin 22 having a shank extending through holes provided in the trunnions 20 and the upper ends of the struts 16, 18. The pin 22 is retained in place in the aforementioned holes by means of studs 26 securing a retainer 24, which urges the head of the pin 22 against a surface of one of the trunnions 20. The lower ends of one set of struts 16 and 18 are individually fastened to vertically extending projections 28 and 30 formed on either end of a resilient block assembly 32. Details of the pivoting assemblies for the lower ends of the struts 16 and 18 may be observed in Figures 3 and 4. Fig. 4 shows the lower end of the strut 16 as comprising a web-like clevis construction 34 having one of the projections 28 interposed therebetween. A pin 36 pivotally secures the clevis construction 34 to the projection 28 by residing in holes provided therein. The pin 36 is retained in place by means of a cotter key 38. In a similar manner the lower end of each of the struts 18 is pivotally secured to a projection 30 by means of a pin extending through holes in the lower end of strut 18 and the projection 30. Pin 40 is retained in place by means of a cotter key 42.

It will be noted in Fig. 1 that interposed between opposite struts 18 are reinforcing members 44, 46, 48 and 50 which are secured together and to the struts 18 by web plates 52 and 54. Interposed between and secured to reinforcing members 56 and 58 of the strut 16 is a web 60. This webbed and reinforced strut assembly provides an extremely rugged means for supporting the semi-trailer king pins and prevents distortion of the struts which might otherwise occur when the railway vehicle 2 is subjected to sudden changes in movement, swaying, etc.

The shock absorbing portion of the support 14 is primarily housed below the cover plates 62 in a pair of longitudinally extending recesses or wells 64 provided in the end of the railway vehicle 2. The wells 64 are formed by means of suitable side plating 66 and bottom plating 68 which may also act as structural frame and underframe members for the railway vehicle to aid in giving it the necessary strength and rigidity. Fixed within each well 64, by welding to the bottom surface thereof and to upper and lower gusset plates 76 and 78 welded to the side plating 66, are longitudinally spaced apart abutments in the form of laterally extending pairs of vertical plates 70, 71. Seated in the wells 64 which as mentioned extend longitudinally of the vehicle are resilient sliding block assemblies 32. Each of these assemblies 32 is fabricated and comprises end sections 72 and 74 which are respectively provided with upper friction sliding pads 88 and 90 adapted to slide longitudinally back and forth on the upper gusset plates 76. Extending between the end sections 72 and 74 are upper and lower connecting strips 80 and 81 which connect the end sections 72 and 74 together defining a rigid elongated body portion of the sliding block assembly. Said end sections and strips form a rectangularly shaped opening 84 into which a large rectangularly shaped resilient body or block 86 is positioned and abuts longitudinally spaced end facing abutments or surfaces against which the block may be compressed. The end sections 72 and 74 are provided with friction sliding plates 88, 90 which slidably rest on the upper gusset plates 76, and are adapted to engage the cover plates 62 to limit upward vertical movement of the sliding block assembly 32. When the sliding block assemblies 32 are in position in the wells 64, small rectangular surfaces 92 and 93 thereon project beyond the opening 84 and are in contact with oppositely facing surfaces 94 and 96 on the abutments 70 and 71, which surfaces face toward opposite ends of the vehicle. While it is not deemed absolutely necessary to pre-load the resilient block 86 when between the surfaces 94 and 96, in actual practice it has proved preferable in order to prevent any rattling and uncontrolled movement between the sliding block assembly and the ends of the railway vehicle 2.

In operation then, the block 86 is pre-loaded so that it is slightly compressed between the surfaces 94 and 96 on the abutments formed by plates 70 and 71 respectively. If the railway vehicle should be subjected to sudden changes in its longitudinal movement, the rubber block 86, due to inertia forces, will be further compressed between either the surfaces 96 and the end section 72 or between the surfaces 94 and the end section 74, depending on the direction in which the change of movement takes place. The amount of compression of block 86, of course, will depend upon the magnitude and suddenness of the forces applied to cause the change in movement in the railway vehicle. It should be noted that any tendency on the part of the resilient block to resonate will be effectively damped by the frictional forces acting between the friction sliding plates 88, 90 and the upper gusset plates 76.

It may now be appreciated that a new type of resilient shock absorbing support of extremely rugged construction has been illustrated and described which is particularly adapted for supporting motor truck semi-trailers on railway vehicles and protecting these semi-trailers from shocks to which said vehicle is subjected. The shock absorbing means is readily accessible for servicing, and due to its extreme simplicity is easy to assembly and inexpensive to manufacture.

We claim:

1. In a railway vehicle for the carriage of a semi-trailer having a supportable king pin at one end thereof, king pin receiving means, supporting struts pivotally connected at their upper ends to said king pin receiving means, a sliding block assembly slidably supported by said railway vehicle on a substantially horizontal sliding friction surface thereof and secured to the lower ends of said struts to permit damped relative movement between said block and said vehicle, stationary end facing abutments on said railway vehicle disposed in the longitudinal direction thereof on opposite sides of and in longitudinal alignment with said sliding block assembly, and resilient means interposed between and abutting said sliding block assembly and said abutments to yieldingly resist horizontal movement of said sliding block assembly and king pin receiving means thereon relative to said vehicle and thereby absorb the shocks to which said railway vehicle is subjected and cushion their transfer to the semi-trailer carried thereon with its king pin supported in said king pin receiving means.

2. In a railway vehicle for the carriage of a semi-trailer having a supportable king pin at one end thereof, a longitudinally extending recess in one end of said vehicle, a pair of longitudinally facing oppositely disposed abutments in said recess, said recess having a lower horizontal friction surface therein, a longitudinal sliding block assembly residing in said recess, said sliding block assembly including end sections secured together by longitudinally extending members which in combination with said end sections define an opening therebetween, sliding friction plates on said end sections and in sliding frictional engagement with the horizontal friction surface in said recess, and a resilient compressible member seated in said opening and projecting on either side thereof, said resilient compressible member being interposed between said abutments and having oppositely facing surfaces on said projections engageable with surfaces on said abutments, said king pin receiving means being mounted on said sliding block assembly and supported thereby.

3. A shock absorbing assembly acting between a pair of load-carrying members one of which supports the other, comprising a pair of oppositely disposed abutments on said one of said members, a horizontal friction surface on one of said members, a sliding block assembly supported on said horizontal friction surface on the one of said members, said sliding block assembly supporting the other of said members, said sliding block assembly including end sections secured together by connecting strips which in combination with said end sections define an opening therebetween, sliding friction plates on said end sections and in sliding frictional engagement with said horizontal friction surface to damp any relative movement between said members, a resilient compressible member in said opening and having projections on either side thereof, said resilient compressible member also being interposed between said abutments and having oppositely facing surfaces on said projections engageable with surfaces on said abutments to yieldingly resist any horizontal relative movement between said members and thereby cushion the transmittal to the other of said members of any shock forces applied to the one of said members.

4. In a railway vehicle for carrying a motor truck semi-trailer having a king pin at one end thereof, anchoring means for said king pin, a shock absorbing support for said anchoring means on said railway vehicle, said support including a slide block assembly and means interconnecting the latter with said anchoring means, said slide block assembly being mounted for limited movement on said railway vehicle in the longitudinal direction thereof, said slide block assembly including means for absorbing shock caused by sudden changes in the longitudinal movement of said railway vehicle relative to said king pin anchoring means, a longitudinal guiding surface on said railway vehicle for guiding longitudinal movement of said slide block assembly, spaced apart stationary abutments on said railway vehicle disposed in the longitudinal direction thereof on opposite sides of said slide block assembly for limiting movement of said assembly on said guiding surface, said shock absorbing means including a body of resilient compressible material secured to a portion of said block assembly and disposed between and in constant abutting contact with said stationary abutments while avoiding physical interference with said guiding means.

5. In a railway vehicle for carrying a motor truck semi-trailer having a king pin at one end thereof, king pin anchoring means, a block assembly connected by intermediate means to and supporting said king pin anchoring means, said block assembly being slidably mounted for limited movement on said railway vehicle in the longitudinal direction thereof, said block assembly including means for absorbing shock caused by sudden changes in the longitudinal movement of said railway vehicle relative to said king pin anchoring means, a longitudinal guiding surface on said railway vehicle for guiding the longitudinal movement of said block, spaced apart stationary abutments on said railway vehicle disposed in the longitudinal direction thereof on opposite sides of said block for limiting movement of said block assembly on said guiding surface, said block assembly having a rigid body portion of elongated shape extending in the longitudinal direction of said railway vehicle, said rigid body portion having opposed side faces thereon, said shock absorbing means being a block-shaped member of resilient compressible material secured to said rigid body portion and projecting beyond at least one side face thereof, said member of resilient material being disposed between and in constant abutting contact with said stationary abutments while avoiding physical interference with said guide surface.

References Cited in the file of this patent

UNITED STATES PATENTS

| | | | |
|---|---|---|---|
| 1,081,853 | Miller | Dec. 16, | 1913 |
| 1,883,306 | Lewis | Oct. 18, | 1932 |
| 1,969,844 | Heath | Aug. 14, | 1934 |
| 2,036,344 | Menhall | Apr. 7, | 1936 |
| 2,047,955 | Fitch | July 21, | 1936 |
| 2,099,288 | Allen | Nov. 16, | 1937 |
| 2,170,581 | West et al. | Aug. 22, | 1939 |
| 2,196,537 | Sherman | Apr. 9, | 1940 |
| 2,197,030 | Clark | Apr. 16, | 1940 |
| 2,305,444 | Pond | Dec. 15, | 1942 |
| 2,525,388 | Willetts | Oct. 10, | 1950 |
| 2,531,871 | Braunberger | Nov. 28, | 1950 |
| 2,592,666 | Doherty | Apr. 15, | 1952 |